Nov. 12, 1946.    O. V. MALMQUIST    2,410,985
TOASTER
Filed Jan. 22, 1945    2 Sheets-Sheet 1
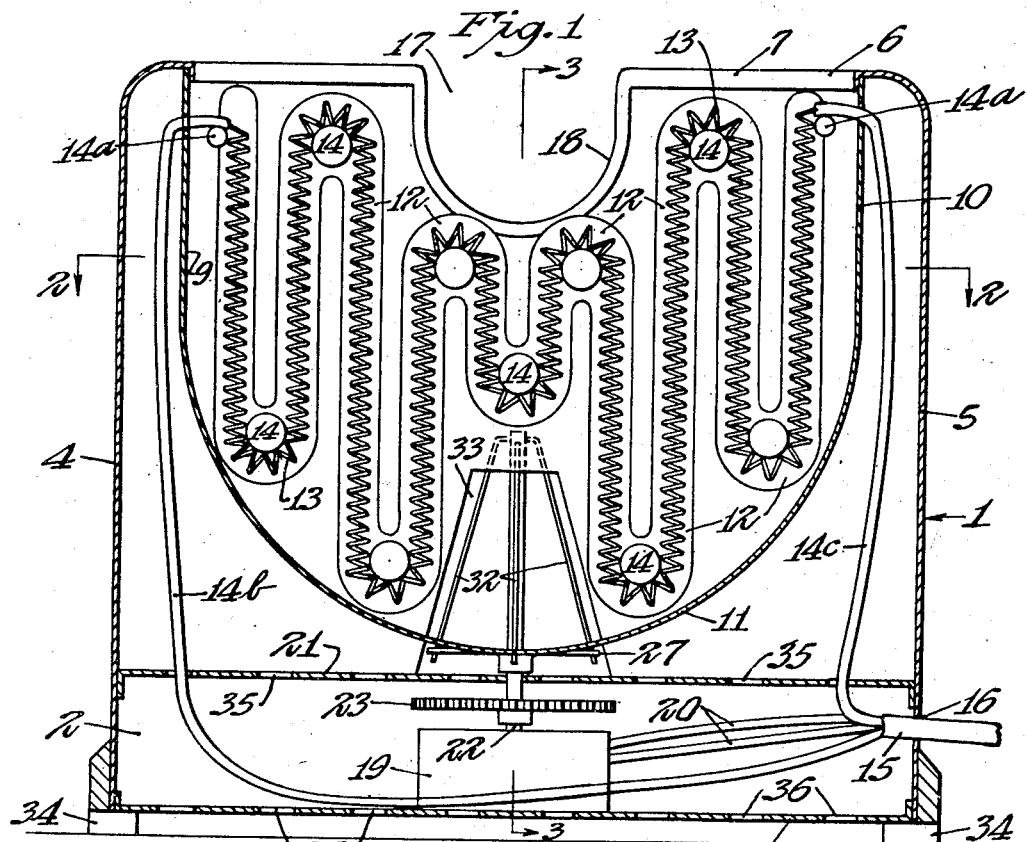
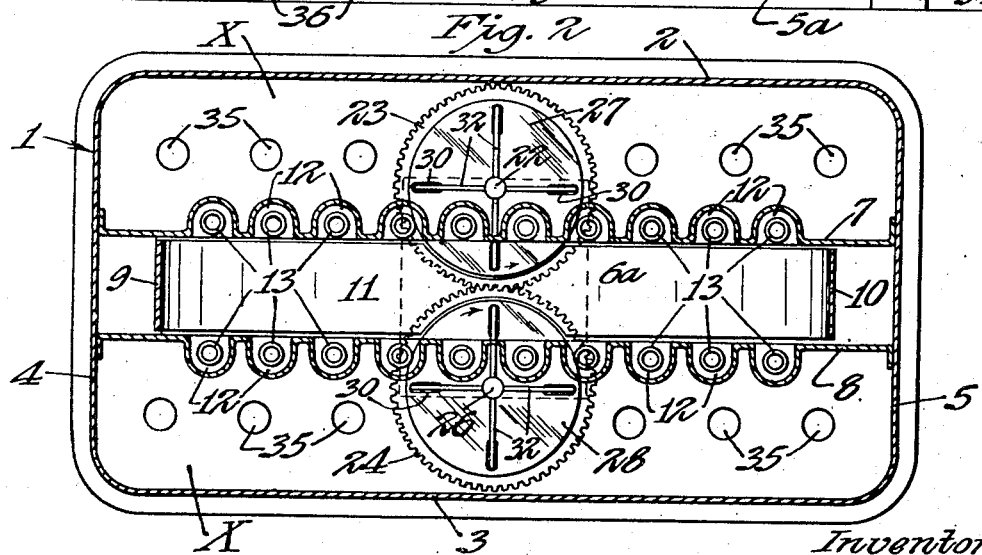
Inventor
Oscar V. Malmquist
By Merchant & Merchant
Attorneys Nov. 12, 1946.   O. V. MALMQUIST   2,410,985
TOASTER
Filed Jan. 22, 1945   2 Sheets-Sheet 2

Inventor
Oscar V. Malmquist
By Merchant & Merchant
Attorneys

Patented Nov. 12, 1946

2,410,985

UNITED STATES PATENT OFFICE 2,410,985

TOASTER

Oscar V. Malmquist, Minneapolis, Minn.

Application January 22, 1945, Serial No. 573,903

11 Claims. (Cl. 99—341)

My invention relates to electric toasters and has for its object the provision of a device of this type which will toast a slice of bread both more rapidly and uniformly than electric toasters heretofore developed.

Another object of my invention is to provide a toaster which is durable in use and which is relatively inexpensive to manufacture.

It has long been the object of manufacturers of toasters to provide a device which would toast the bread uniformly, to wit: free of design or pattern. Design or pattern is caused by an uneven distribution upon the bread slice of the heat emanating from the heating means and can be avoided by moving the bread through the heating or toasting chamber. However, it has been found that the length of the heating chamber and hence of the heater itself must be so increased by movement of the bread through the heating chamber that the cost of the toaster is unduly increased.

In my novel toaster, I have designed a relatively foolproof mechanism which will constantly rotate the bread while the same is in the heating or toasting chamber, thus producing a slice of toast of uniform color, free from so-called pattern. Furthermore, I have accomplished this result without increasing the length of the toasting chamber and without increasing the cost of the toaster beyond the range of the average timer toaster.

The above and other objects of my invention will become apparent from the following specification and from the attached drawings.

Referring to the drawings wherein like characters indicate like parts throughout the several views:

Fig. 1 is a vertical axial section of my novel toaster, some parts on the section line being shown in full;

Fig. 2 is a transverse horizontal section taken on the line 2—2 of Fig. 1;

Figure 3:
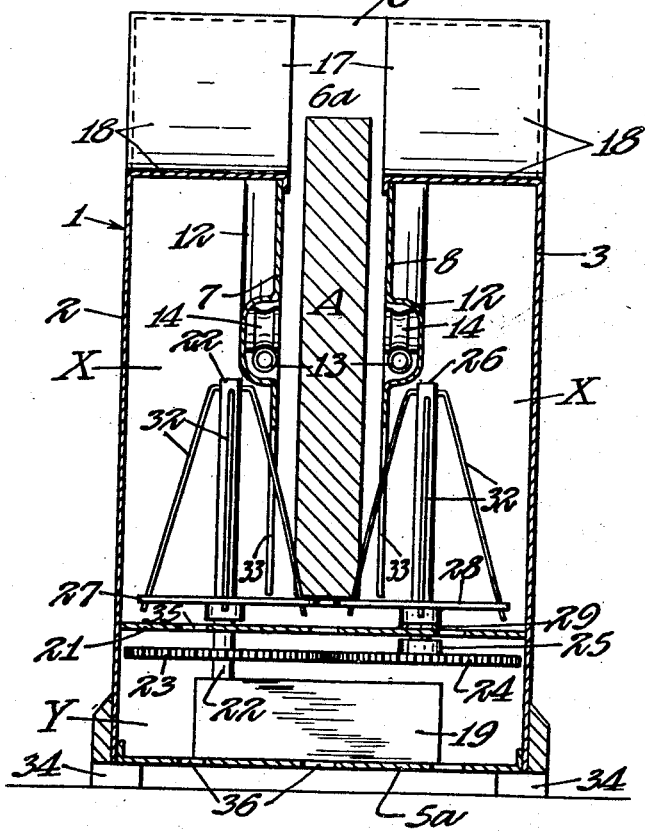
Fig. 3 is a transverse vertical section taken substantially on the line 3—3 of Fig. 1, some parts on the section line being shown in full.

Referring more specifically to the drawings, numeral 1 indicates a metallic housing 1 which, as shown, is made up of vertically disposed rectangular side members 2 and 3, narrow rectangular end members 4 and 5, and a perforate bottom member 5a. These side members 2 and 3 and end members 4 and 5 are bent inwardly at their upper ends so that their upper edges terminate in the form of a rectangular slot 6, of a size to freely receive a slice of bread therein. Slot 6 is the entrance to a toasting chamber 6a which has vertically disposed sides 7 and 8, and vertical end pieces 9 and 10 and a rounded bottom 11. It will be observed that sides 7 and 8 of the toasting chamber while parallel to sides 2 and 3 of the housing 1, are spaced inwardly therefrom a considerable distance. Likewise, sides 9 and 10 of heating chamber, while substantially parallel to the vertical ends 4 and 5 of the housing are also inwardly spaced therefrom a distance at least sufficient to permit wiring and the like. As shown, it has been found practical to make end members 9 and 10 and rounded bottom member 11 from a single narrow strip of metal.

Vertical side members 7 and 8, vertical end members 9 and 10 and rounded bottom 11 of the toasting chamber 6a are all made from polished metal capable of standing the relatively high degree of heat to which such toasters are subjected.

As shown, each of the vertical side members 7 and 8 of the toasting chamber is provided with serpentine depressions or recesses 12 through which heating coils 13 are wound. As shown in Fig. 1, the center of each curve in the recess is provided with a porcelain insulator 14, suitably secured to the side members 7 and 8, so as to prevent contact of the heating coils 13 with the metallic side walls 7 and 8 of the heating chamber. Also, with reference to Fig. 2 the serpentine depressions 12 are sufficiently larger than the supporting coils 13 to assure freedom of contact therebetween.

The opposite ends of the heating coil 13 are shown as being insulated from side members 7 and 8 by porcelain insulators 14a and connected by wires 14b and 14c to a source of electrical current 15 shown as entering housing 1 through an opening 16 in vertical end member 5.

The vertical side members 7 and 8, as shown, are provided along their upper edges with centrally located substantially U-shaped notches 17 which extend downwardly and inwardly into the heating chamber. Member 18 is a flat strip with a U-shaped centrally located opening for removing the toast as shown in Fig. 3.

Substantially in the center of perforate bottom 5a is a synchronous electric motor 19 with suitable self-contained speed reducing gearing. Motor 19 is shown as being connected by electric wires 20 to a source of electrical energy 15.

A perforate baffle 21 situated midway between the top of motor 19 and rounded bottom 11 of the toasting chamber 6a, divides the inside of the housing into upper and lower compartments X and Y. A driven shaft 22 extends upwardly from one side of the electric motor 19 approximately midway into one side of the upper compartment or chamber X. Keyed or otherwise made fast to shaft 22 at a point midway between the top of motor 19 and the perforate baffle 21 is a gear 23 which is in mesh with a similar gear 24 identically situated on the other side of motor 19, immediately thereabove. Gear 24 has an upwardly projecting boss 25 to which the lower end of shaft 26 is secured. Shaft 26 extends through a perforation in plate 21 upwardly to a distance approximately equal to that of shaft 22. Thus, I have two laterally spaced shafts 22 and 26, respectively, turning in opposite directions and located in upper compartment X one on each side but in the longitudinal center of the lower end of toasting chamber 6a.

Figure 4:
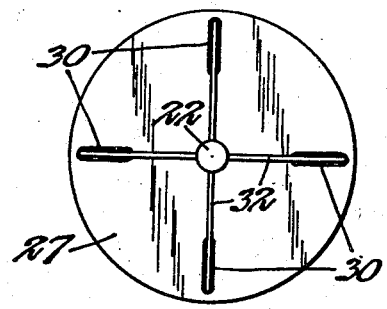
Fig. 4 is a top plan view of one of the bread slice rotating devices.

Keyed or otherwise made fast to shaft 22 at a point immediately above perforate baffle 21 is a boss-equipped metallic disc 27. Similarly situated on shaft 26 is an identical boss-equipped disc 28. It will be observed that perforate baffle 21 is built up slightly at 29 to form a bearing for the depending boss of disc 28, thus supporting shaft 26. As shown in Figs. 2 and 4 each of the discs 27 and 28 is provided with radially extending slots 30 and are spaced 90° apart.

Rigidly secured to the top ends of both shafts 22 and 26 are resilient fingers 32, shown as being made in the form of inverted V-shaped springs. As shown, the lower ends of resilient fingers 32 project through the radially extending slots 30, pressing lightly outwardly against their outer ends.

By reference particularly to Figs. 1 and 3 it will be observed that the vertical side members 7 and 8 and rounded bottom member 11 of the toasting chamber 6a are notched away at 33 so as to allow the discs 27 and 28 and the lower portions of resilient fingers 32 to enter the bottom of the toasting chamber 6a to an extent, and in a position approximately as shown in Figs. 2 and 3. Also, curved bottom member 10 is provided with two half round notches for this purpose.

Housing 1 is shown as being mounted on feet 34, to raise the bottom 5a off the surface on which the toaster rests. Perforations 35 in the baffle 21 and perforations 36 in the bottom plate 5a both ventilate the inside of the housing and allow crumbs from the toast to drop through.

*Operation*

When the source of electrical current 15 is turned on electric current is simultaneously applied to connections 14b, 14c and 20 thus heating up the electric heating coils 13 recessed in serpentine passages 12 on each side of the toasting chamber 6a. At the same time electric motor 19 with suitable self-contained speed reducing gearing starts to run, thus rotating shaft 22. When shaft 22 rotates, it also rotates gear 23 in the same direction. Gear 23 in turn rotates gear 24 in the opposite direction. Shaft 26, secured fast to gear 24, is turned in the same direction as gear 24.

Discs 27 and 28, being secured fast to shafts 22 and 26, respectively, will also turn in opposite directions as will the several resilient fingers 32 which are free for limited radial movement in slots 30 of the discs 27 and 28. It is important to note, however, that resilient fingers 32 while free for limited radial movement, are held fast in said slots 30 from lateral movements.

Let us assume that a normal slice of bread A is now placed into the toasting chamber 6a. The bottom of the slice of bread A will immediately come into contact with the opposed rotating resilient fingers 32, one on each side of the slice of bread. These fingers 32 being mounted in said discs 27 and 28 for radial movement will thus be compressed or bent inwardly toward their axes of rotation as they get closer together. In other words, they will be spread further apart by the bread so as not to crush the same. On the other hand, in view of the fact that fingers 32 are precluded from lateral movements in slots 30 they will grasp the slice of toast with sufficient grip to assure that the bread is carried along with the rotation of the fingers. In this manner each pair of successive fingers contacts the bread slice in an identical manner and assures constant rotation of the slice A during the toasting operation.

Another important factor is the location of the coils 13 in the serpentine channels 12. That is, they are so located immediately inwardly of the plane of the vertical sides 7 and 8 of the heating chamber 6a that the slice of bread A may rub against these vertical walls without actually coming into contact with the coils 13.

Another important factor is that due to the substantially U-shaped slots 18 in the upper edge of the heating chamber 6a, a portion of the rotating slice of bread A will be in constant view, thus enabling the operator to remove the slice whenever it has reached the desired color.

What I claim is:

1. In a bread toaster, a casing providing a narrow toasting chamber adapted to support a slice of bread in vertical position and having a rounded bottom permitting rotation of the bread slice thereon, electrical heating means within said toasting chamber, and a power driven rotary impelling device positioned to engage a marginal edge of a bread slice and impart rotary movement thereto on its marginal edge within the toasting chamber.

2. In a bread toaster, a casing providing a toasting chamber having laterally spaced walls and a rounded bottom, heating means located adjacent opposite sides of the toasting chamber, and a laterally spaced pair of radially resilient impelling devices, each projecting into the bottom portion of the toasting chamber and adapted to engage the marginal edge portion of a bread slice therebetween, said impelling devices being driven in opposite directions.

3. The structure defined in claim 2 in which the said impelling devices each comprise a rotary shaft extending parallel to but extending outside of the toasting chamber and a circumferentially spaced plurality of resilient impelling fingers projecting downwardly and outwardly therefrom and said fingers being under their own tension to move radially outwardly at their lower ends, the radial distance from the axis to the radial outer portions of said spring fingers being greater than the radial distance from said shafts to the toasting chamber, and the walls of said toasting chamber being provided with openings to receive said spring fingers, whereby under opposite rotation of the impelling devices the said spring fingers will engage opposite marginal edge portions of the bread slice and impart rotation thereto within the toasting chamber.

4. In a bread toaster, a casing providing a vertically disposed narrow toasting chamber having a rounded bottom and opening through a slot in the top of the casing, electric heating elements adjacent opposite vertical walls of the toasting chamber, laterally spaced rotary impelling devices located at the base of the heating chamber and spaced apart a distance less than the thickness of a slice of bread to be toasted, whereby the impelling devices will engage laterally opposite marginal edge portions of a bread slice under yielding pressure, and power mechanism for driving the said impelling devices in opposite directions.

5. The structure defined in claim 4 in which the said resilient impelling devices are shaped to provide an upwardly and outwardly diverging space therebetween within the base portion of the toasting chamber.

6. The structure defined in claim 4 in which the said resilient impelling devices are shaped to provide an upwardly and outwardly diverging space therebetween within the base portion of the toasting chamber, and in which each impelling device comprises a circumferentially spaced plurality of yielding fingers.

7. In a bread toaster, a casing formed to provide a vertically disposed toasting chamber having a rounded bottom adapted to support a bread slice for rotation on its marginal edge, laterally spaced guide elements adapted to receive a bread slice therebetween, heating means disposed at opposite side portions of the toasting chamber, and a laterally spaced pair of rotary impelling devices disposed adjacent the rounded bottom portion of the toasting chamber, said rotary impelling devices being disposed on parallel vertical axes and each thereof having downwardly and outwardly diverging impelling surfaces forming an upwardly converging space between the impelling surfaces of opposite impelling devices, the minimum spacing between impelling surfaces and opposite impelling devices being less than the thickness of a normal slice of bread and said impelling devices being radially resilient, and means driving the impelling devices in opposite directions, whereby a slice of bread disposed within the toasting chamber will be engaged between opposite resilient impelling devices adjacent the laterally spaced sides of its marginal edge portion and rotated on its marginal edge within the toasting chamber.

8. In a bread toaster, a casing providing a toasting chamber having laterally spaced vertical sides containing heating means, a rounded bottom in said chamber adapted to support a slice of bread for rotation on its marginal edge, said toasting chamber opening upwardly through the top of the casing, laterally spaced radially yielding impelling devices located adjacent the base portion of the toasting chamber and adapted to engage laterally opposed side portions of a slice of bread disposed within the toasting chamber, said impelling devices each comprising a vertically disposed rigid rotary element carrying a radially projecting disc adjacent the plane of the base of the toasting chamber and a circumferentially spaced plurality of spring fingers anchored to the upper portions of said rigid rotary elements and projecting downwardly and outwardly therefrom through a radial slot in the disc of that impelling device, each spring finger being under its own yielding tension to move against the outer end of its slot and the minimum spacing between radially opposed spring fingers of opposite impelling devices being less than the thickness of a normal slice of bread, and means for driving the impelling device in opposite directions.

9. In a bread toaster, a casing providing a vertically disposed toasting chamber opening through the top of the casing, an electrical heating element in said toasting chamber, power driven impelling apparatus engaging the marginal edge portion of a slice of bread and imparting rotary movements thereto, and notches in opposite side walls of the casing extending downwardly from the top thereof to permit inspection of the rotating bread slice during the toasting process and removal thereof when toasted.

10. The structure defined in claim 9 in further combination with electrical heating elements disposed at opposite sides of the toasting chamber.

11. The structure defined in claim 9 in further combination with electrical heating elements disposed at opposite sides of the toasting chamber, said heating elements being of the resistance type and being disposed in inwardly opening channel-like recesses in the side walls of the toasting chamber whereby the bread slice may engage and be guided by the walls of the toasting chamber without directly contacting said heating elements.

OSCAR V. MALMQUIST.